(12) United States Patent
Chackungal et al.

(10) Patent No.: US 12,299,981 B2
(45) Date of Patent: *May 13, 2025

(54) SYSTEMS AND METHODS FOR RECORDING PORTION OF SPORTS GAME

(71) Applicant: Adeia Guides Inc., San Jose, CA (US)

(72) Inventors: Abraham George Chackungal, Karnataka (IN); Christopher Charles Lidaka, Apex, NC (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/526,893

(22) Filed: Dec. 1, 2023

(65) Prior Publication Data

US 2024/0169730 A1 May 23, 2024

Related U.S. Application Data

(63) Continuation of application No. 16/936,692, filed on Jul. 23, 2020, now Pat. No. 11,869,242.

(51) Int. Cl.
| | |
|---|---|
| *G06V 30/14* | (2022.01) |
| *G06V 20/40* | (2022.01) |
| *G06V 30/10* | (2022.01) |
| *G06V 30/148* | (2022.01) |
| *G10L 15/22* | (2006.01) |
| *H04N 5/76* | (2006.01) |

(52) U.S. Cl.
CPC .............. *G06V 20/42* (2022.01); *G06V 30/10* (2022.01); *G06V 30/153* (2022.01); *G10L 15/22* (2013.01); *G10L 2015/223* (2013.01)

(58) Field of Classification Search
USPC .............. 348/14.01–14.16, 61–77; 382/100, 382/155–160; 704/1–275
See application file for complete search history.

(56) References Cited

U.S. PATENT DOCUMENTS

| 8,091,111 B2 | 1/2012 | Logan et al. |
| 8,606,090 B2 | 12/2013 | Eyer |
| 8,640,165 B2 | 1/2014 | Ellis et al. |
| (Continued) | | |

FOREIGN PATENT DOCUMENTS

EP 3009959 A2 4/2016

OTHER PUBLICATIONS

Schwartz Erik; Identifying Content of Interest; 2016 (Year: 2016).*

*Primary Examiner* — Marcellus J Augustin
(74) *Attorney, Agent, or Firm* — Haley Guiliano LLP

(57) ABSTRACT

Systems and methods are provided herein for recording a portion of content of a sports game. A request to record the portion of the content, which specifies game clock time criteria, is received by user equipment. During transmission of the content, frames of the content including a game progress graphic are analyzed to determine time values representing progress points of the sports game. In response to determining that a first time value representing a first progress point of the sports game matches the game clock time criteria of the request, the user equipment begins to record the portion of the content. In response to determining that a second time value does not match the game clock time criteria of the request, the user equipment stops the recording of the portion of the content and stores the recorded portion of the content.

20 Claims, 10 Drawing Sheets

(56) References Cited

U.S. PATENT DOCUMENTS

| | | | |
|---|---|---|---|
| 9,344,768 B2 | 5/2016 | Knudson et al. | |
| 9,392,324 B1* | 7/2016 | Maltar | G06F 16/739 |
| 9,442,933 B2 | 9/2016 | Tzoukermann et al. | |
| 9,640,220 B2 | 5/2017 | Clevenger et al. | |
| 9,713,764 B2* | 7/2017 | Minkovitch | A63F 13/812 |
| 10,080,054 B2* | 9/2018 | Xhafa | H04N 21/4334 |
| 10,257,547 B1* | 4/2019 | Yan | H04N 21/47217 |
| 10,609,454 B2 | 3/2020 | Printz et al. | |
| 11,128,636 B1* | 9/2021 | Jorasch | G06F 3/0346 |
| 11,218,775 B2* | 1/2022 | Curtis | H04N 21/435 |
| 11,869,242 B2* | 1/2024 | Chackungal | G06V 30/153 |
| 2006/0168625 A1 | 7/2006 | Gildred | |
| 2008/0163306 A1 | 7/2008 | Sonoda | |
| 2008/0307485 A1 | 12/2008 | Clement et al. | |
| 2010/0104257 A1 | 4/2010 | Broberg | |
| 2011/0311205 A1* | 12/2011 | McClanahan | H04N 5/76 725/39 |
| 2015/0248917 A1 | 9/2015 | Chang et al. | |
| 2015/0281778 A1 | 10/2015 | Xhafa et al. | |
| 2015/0312652 A1 | 10/2015 | Baker et al. | |
| 2016/0105634 A1* | 4/2016 | Marchese | H04N 5/91 386/241 |
| 2016/0110877 A1 | 4/2016 | Schwartz et al. | |
| 2018/0070146 A1* | 3/2018 | Curtis | H04N 21/262 |
| 2019/0068915 A1 | 2/2019 | Okada | |
| 2019/0273965 A1* | 9/2019 | Shurgot | H04N 21/4147 |
| 2022/0027630 A1 | 1/2022 | Chackungal et al. | |

\* cited by examiner

SYSTEMS AND METHODS FOR RECORDING PORTION OF SPORTS GAME

CROSS REFERENCE TO RELATED APPLICATION

This application is a continuation of U.S. patent application Ser. No. 16/936,692, filed Jul. 23, 2020, which is hereby incorporated by reference herein in its entirety.

BACKGROUND

The present disclosure is directed to systems and methods for recording a portion of content of a sports game, and, more particularly, for recording a portion of content of a sports game based on a game progress graphic included in frames of the content.

SUMMARY

Users may only be interested in viewing a certain portion of content of a sports game. Oftentimes, a user may schedule a recording of content of a sports game to watch at a later time. However, if the user wishes to view only a portion of the recorded content, the user must spend time navigating through the recording to find the desired portion. Because the progress of sports games controlled by a game clock does not correspond directly to the progress of the broadcast of the content of the sports game, it may take the user considerable time navigating to the desired portion. Additionally, if the user intends to view only that portion of the recorded content, space on the user's recording device may be needlessly taken up by the remaining portion of the recorded content that the user has no interest in viewing. Accordingly, it would be advantageous if users were able to schedule a recording for only a select portion of content of a sports game that they are interested in viewing.

In view of the foregoing, the present disclosure provides systems and related methods that allow a portion of content of content of a sports game to be scheduled and subsequently recorded by receiving a request to record a portion of content of a future sports game, the request including game clock time criteria. During transmission of the content, a first frame of the content that includes a game progress graphic is analyzed to determine a first time value representing a first progress point of the sports game. In response to the determining that the first time value matches the game clock time criteria of the request, recording the portion of the content is started. A second frame of the content that includes the game progress graphic is analyzed to determine a second time value representing a second progress point of the sports game. In response to the determining that the second time value does not match the game clock time criteria of the request, the recording of the portion of the content is stopped, and the recorded portion of the content is stored.

In some embodiments of the present disclosure, the request may be a natural language command received from a user. The natural language command may be processed to determine the game clock criteria, and the determined game clock criteria may be stored in association with the request.

In some embodiments of the present disclosure, the natural language command may be a voice command uttered by the user.

In some embodiments of the present disclosure, analyzing the first frame of the content that includes the game progress graphic to determine the first time value representing progress of the sports game may include determining that the sports game is a first sport of a plurality of sports, retrieving timing rules associated with the first sport, identifying the game progress graphic in the first frame, and analyzing the identified game progress graphic using optical character recognition (OCR) to determine the first time value, based on the retrieved timing rules associated with the first sport.

In some embodiments of the present disclosure, the game progress graphic may include a game clock and at least one other progress indicator associated with the game clock. The at least one other progress indicator may be identified based on the retrieved timing rules associated with the first sport, and may indicate a current one of a quarter, a period, a half, or a round of the first sport.

In some embodiments of the present disclosure, a user interface including a first selectable image representing the stored recorded portion of the content and a second selectable image representing a second stored recording of a program may be generated for display. The user interface may hide a duration of the stored recorded portion of content and may display a duration of the second stored recording of the program.

In some embodiments of the present disclosure, in response to determining that the game clock time criteria includes a request to record to an end of regulation play for the sports game, overtime rules associated with the sports game may be retrieved, and at the end of regulation play for the sports game, it may be determined whether the sports game will extend into overtime play, based on the retrieved overtime rules. In response to determining that the sports game will extend into overtime play, the recording of the portion of the content may be continued until the overtime play has ended.

In some embodiments of the present disclosure, the determining whether the sports game will extend into overtime play may include analyzing a third frame of the content that include the game progress graphic to determine that the sports game is at the end of regulation play. In response to determining that the sports game is at the end of regulation play, the game progress graphic of the third frame may be analyzed to determine if a score of the sports game is tied. In response to determining that the score of the sports game is tied, whether the sports game will extend into overtime play may be determined, based on the retrieved overtime rules.

In some embodiments of the present disclosure, after the beginning to record the portion of the content and before the stopping of the recording of the portion of the content, frames that include the game progress graphic may be analyzed to determine changes in time values representing the progress of the sports game, game progress data may be generated based on the determined changes in time values, and the generated game progress data may be associated with the recorded portion of the content. Storing the recorded portion of the content may include storing the associated game progress data with the recorded portion of the content.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Many sports are timed games in which the progress of the game is controlled by a game clock. Oftentimes, when these sports are broadcast, a game progress graphic is overlaid on frames of the content of the broadcast. The information included in the game progress graphic may vary based on the sport being played or the content provider who is adding the graphic. For example, professional basketball games (e.g., NBA games), are divided into four twelve-minute quarters. NBA is a trademark owned by NBA Properties, Inc. During each quarter, a game clock may count down from twelve minutes. If the game is tied at the end of regulation play (i.e., all four quarters are complete), the game will continue with five minute overtime periods. Thus, content of a professional basketball game may include a game progress graphic in which a game clock is displayed along with an associated indicator representing the current quarter or overtime period.

Systems and methods are described herein for allowing a user to schedule a recording for a select portion of content of a sports game that they wish to view in the future. For example, instead of requiring the user to record the entire content of the sports game and then navigate to the portion of the content that they wish to view, the systems and methods described herein allow the user to specify game clock time criteria associated with the particular sport when scheduling the recording of the content of the sports game. For example, after receiving a user request to record a particular portion of a sports game, user equipment scheduled to perform the recording may, when receiving the content of the sports game, analyze frames of the content that include the game progress graphic to identify frames corresponding to the user request to record.

Figure 1A:
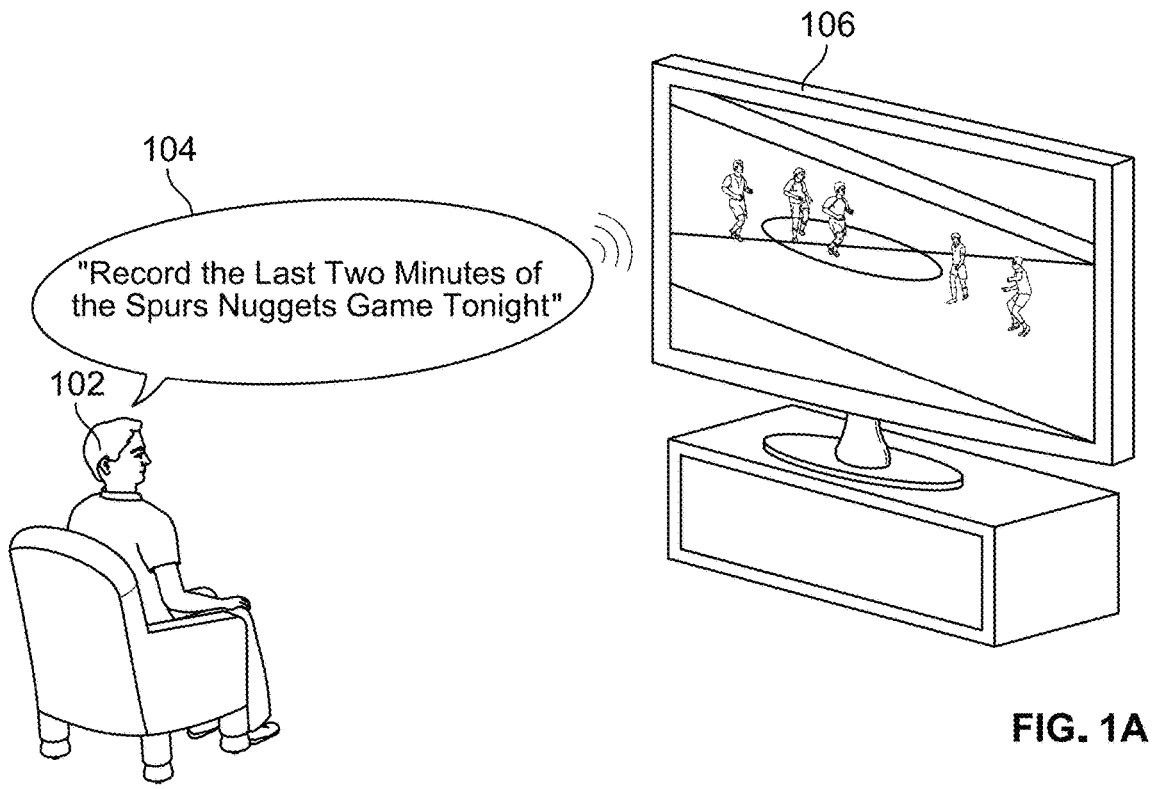
FIG. 1A shows an illustrative embodiment of receiving a user request to record a portion of a future sports game, in accordance with some embodiments of the present disclosure.

FIG. 1A shows an illustrative embodiment of receiving a user request to record a portion of a future sports game, in accordance with some embodiments of the present disclosure. As shown in FIG. 1A, a user 102 may utter a voice command 104 to record a portion of a sports game by saying "Record the last two minutes of the Spurs Nuggets game tonight." In some embodiments of the present disclosure, user television equipment 106 may capture the voice command 104 using a microphone. A media player application, implemented on the user television equipment 106, may process the voice command to determine the content that the user 102 wishes to record. For example, the media player application may use natural language processing to determine the content and the portion of the content that the user 102 wishes to record. In some embodiments of the present disclosure, the media player application may search a schedule (e.g., an electronic program guide) or other schedules of available content (e.g., broadcast content, internet content, etc.) and determine that the voice command 104 corresponds to the SAN ANTONIO SPURS vs. the DENVER NUGGETS game, scheduled to be broadcast on TNT from 7:00 PM-10:00 PM tonight. San Antonio Spurs is a trademark owned by San Antonio Spurs, LLC; Denver Nuggets is a trademark owned by Denver Nuggets, L.P.; and TNT is a trademark owned by Turner Network Television, Inc.

The media player application may then determine the portion of the San Antonio Spurs vs. the Denver Nuggets game to record. To do this, the media player application may first determine whether the identified content is a sports game associated with a game clock. For example, in some embodiments of the present disclosure, the media player application may analyze the title of the content or metadata associated with the content that is included in a listing of the content (e.g., in an electronic program guide) and determine that the content is an NBA basketball game. In some embodiments of the present disclosure, the media player application may perform image processing once the content is received to determine that the content is an NBA basketball game. The media player application may retrieve (e.g., from a database of timing rules for a plurality of sports) timing rules associated with an NBA basketball game. The timing rules may include regulation time rules (e.g., four twelve-minute quarters), and overtime rules (e.g., five minute periods if the game is tied at the end of regulation time) associated with an NBA basketball game. The timing rules may also include other timing rules (e.g., shot clock timing rules, etc.) associated with an NBA basketball game. Based on the retrieved timing rules, the media player application may schedule a recording of the portion of the content corresponding to the last two minutes of the game (i.e., corresponding to the game clock from 02:00-00:00 in the fourth quarter). That is, the media player application may determine that the voice command 104 corresponds to the game clock associated with the game and not, e.g., the last two minutes of the broadcast time of the content (i.e., 9:58 PM-10:00 PM). Additionally, because the voice command 104 specified the end of regulation time, the media player application may also schedule the recording to include any overtime portion of the content at the end of regulation time.

Although the user television equipment 106 is described as receiving a voice command 104 directly from the user 102, this is only one example and the user television equipment 106 (or any other user equipment associated with the media player application) may receive the voice command 104 in any suitable manner. For example, the voice command 104 may be captured and transmitted to the user television equipment 106 by a remote control associated with the user television equipment 106, by a digital speech assistant (e.g., "Alexa") connected to the same network as the user television equipment 106, by a smartphone of the user, etc. Additionally, although the user 102 is described as uttering the voice command 104, this is only one example, and the user 102 may request scheduling of a portion of a content in any suitable manner. For example, as described below with reference to FIG. 1B, the user 102 may request scheduling of a portion of a content through a user interface (UI).

Figure 1B:
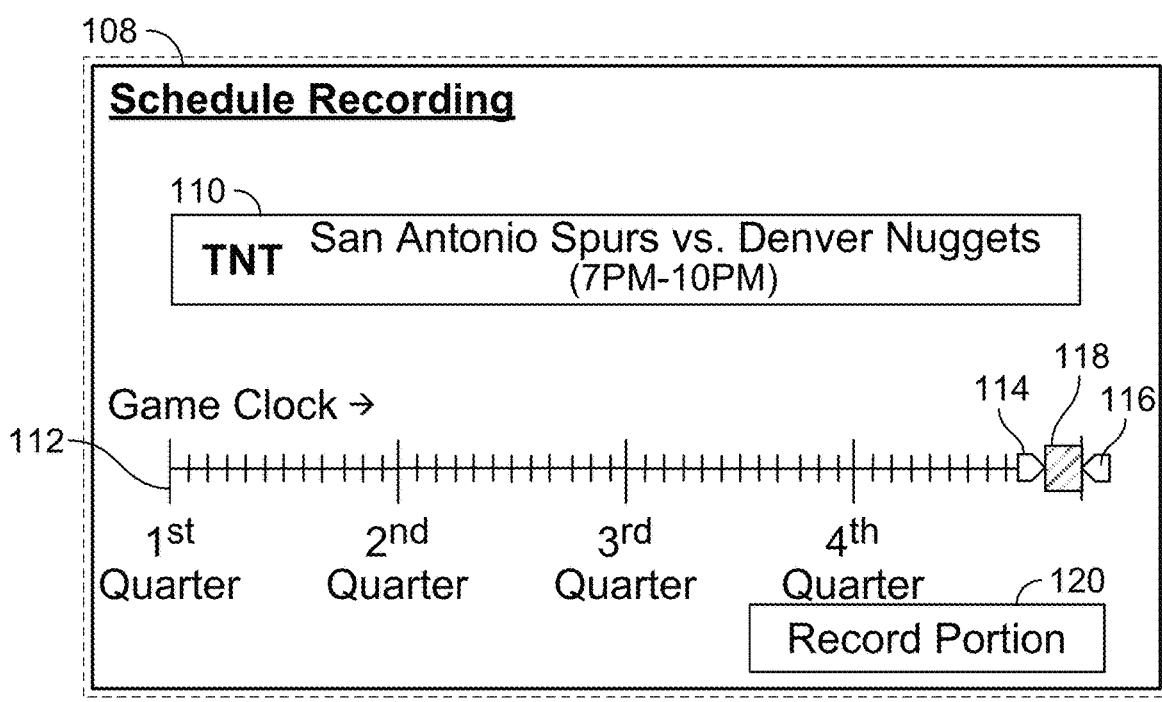
FIG. 1B shows an illustrative embodiment of a user interface that allows a user to designate a portion of a sports game to record, in accordance with some embodiments of the present disclosure.

FIG. 1B shows an illustrative embodiment of a UI 108 that allows a user to designate a portion of a sports game to record, in accordance with some embodiments of the present disclosure. The UI 108 may be displayed on the user television equipment 106, on a remote for the user television equipment 106, or on any other user display device or scheduling device associated with the media player application. In some embodiments of the present disclosure, the UI 108 may be associated with an electronic program guide (EPG) displayed on the user television equipment 106. For example, the user 102 may select the game (e.g., San Antonio Spurs vs. the Denver Nuggets on TNT from 7:00 PM-10:00 PM tonight) from the electronic program guide. As shown, after the game is selected, a custom UI (the UI 108) may be generated for display, based on the determined sport and associated timing rules, as described above). The UI 108 may include an icon 110 corresponding to the selected game along with a slider bar 112 that corresponds to the timing rules for the selected game. For example, as shown, the slider bar 112 may represent the forty-eight minutes of an NBA game as individual minutes across four quarter. Using the sliders 114 and 116, the user 102 may designate a portion 118 of the game to record (e.g., the last two minutes of the fourth quarter) with respect to the game clock. Although the resolution of the slider bar 112 is shown in one-minute increments (i.e., corresponding to the game clock), the slider bar 112 may have any resolution greater than or equal to the smallest increment of the game clock and less than the entire game (e.g., one second, fifteen seconds, two minutes, one quarter, one half). After the portion 118 is designated, the user 102 may schedule the selective recording by selecting record portion icon 120.

Figure 2A:
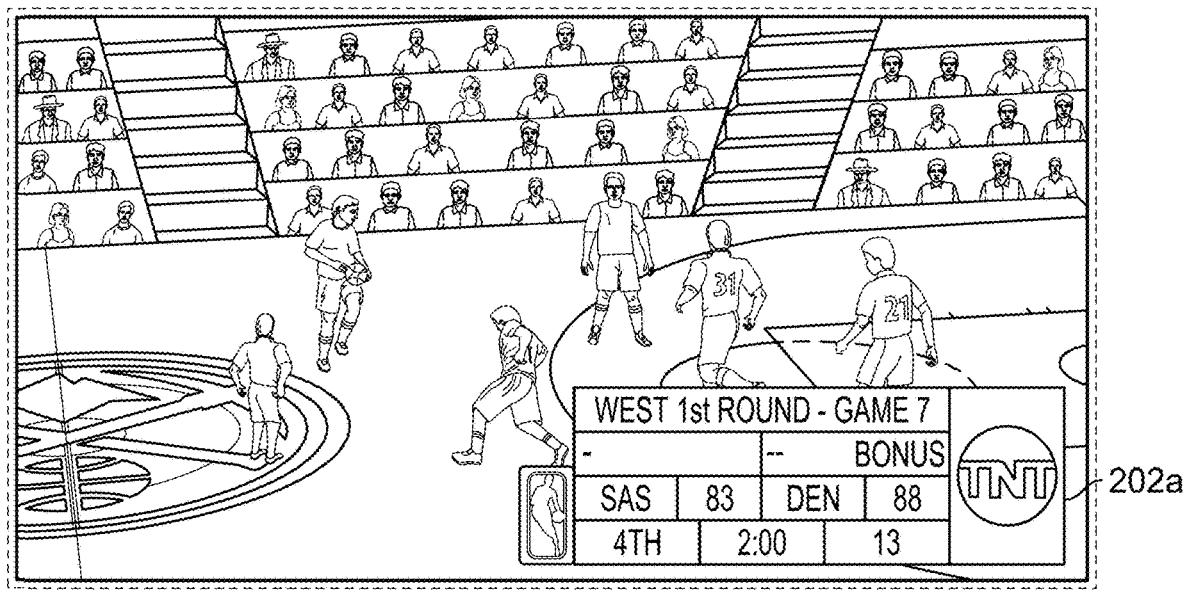
FIGS. 2A-2D show an illustrative embodiment of determining frames of content of the requested sports game that correspond to the portion of the content scheduled to be recorded, in accordance with some embodiments of the present disclosure.

FIGS. 2A-2D show an illustrative embodiment of determining frames of content of the requested sports game that correspond to the portion of the content scheduled to be recorded, in accordance with some embodiments of the present disclosure. For example, FIGS. 2A-2D show an illustrative embodiment of determining frames of the content comprising the "last two minutes" of the San Antonio Spurs vs. the Denver Nuggets game. When the user television equipment 106 receives the content of the San Antonio Spurs vs. the Denver Nuggets game (e.g., an audio/video stream), the media player application may use machine learning, image recognition/optical character recognition (IR-OCR) algorithms, and the retrieved timing rules associated with the game to identify a game progress graphic overlaid on frames of the content and the information displayed in the game progress graphic. The media player application may continue to monitor the game progress graphic until an identified time value representing the progress of the game matches the game clock time criteria associated with the portion of the content scheduled to be recorded, as shown in FIG. 2A. In some embodiments of the present application, the media player application may not analyze all frames of the content. For example, to reduce processing the media player application may periodically select (e.g., every second) a frame to analyze. The game progress graphic may not be displayed on all frames of the content. For example, the game progress graphic may not be displayed during commercials or during certain portions of the game.

Frame 200a of FIG. 2A includes a game progress graphic 202a. After identifying the game progress graphic 202a, the media guidance application may determine that the current time value is "4TH 2:00" (i.e., two minutes remaining in the fourth quarter). In response to determining that the current time value matches the game clock time criteria associated with the portion of the content scheduled to be recorded, the media guidance application may instruct the user television equipment 106 to begin recording the portion of the content. In some embodiments of the present disclosure, the media guidance application may also identify other information displayed in the game progress graphic 202a. For example, the media guidance application may identify the current score of the teams "SAS 83" and "DEN 88" (i.e., San Antonio Spurs: 83 points; Denver Nuggets: 88 points), the time remaining on the shot clock "13" (i.e., 13 seconds remaining), etc. In some embodiments of the present disclosure, the media guidance application may generate enhanced metadata based on this identified information and store the enhanced metadata in association with the recorded portion of the content.

Figure 2B:
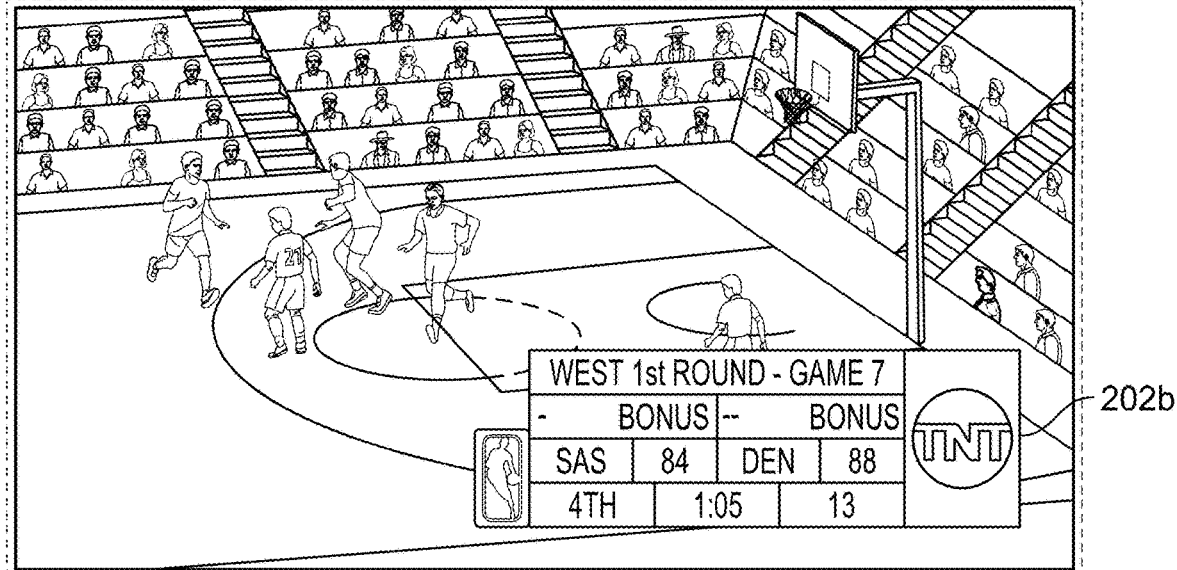

Frame 200b of FIG. 2B includes a game progress graphic 202b. As shown, in the game progress graphic 202b, the current time value is "4TH 1:05" (i.e., one minute and five seconds remaining in the fourth quarter). In response to determining that the current time still matches the game clock time criteria, the media guidance application may continue to instruct the user television equipment 106 to record the portion of the content. In some embodiments of the present disclosure, the media guidance application may continue to generate enhanced metadata based on changes in the game progress graphic 202b. For example, the enhanced metadata may indicate when the score of the San Antonio Spurs changed from "83" to "84." Additionally, in some embodiments of the present disclosure, changes in the current time value may be included in the enhanced metadata (e.g., every time the game clock changes).

Figure 2C:
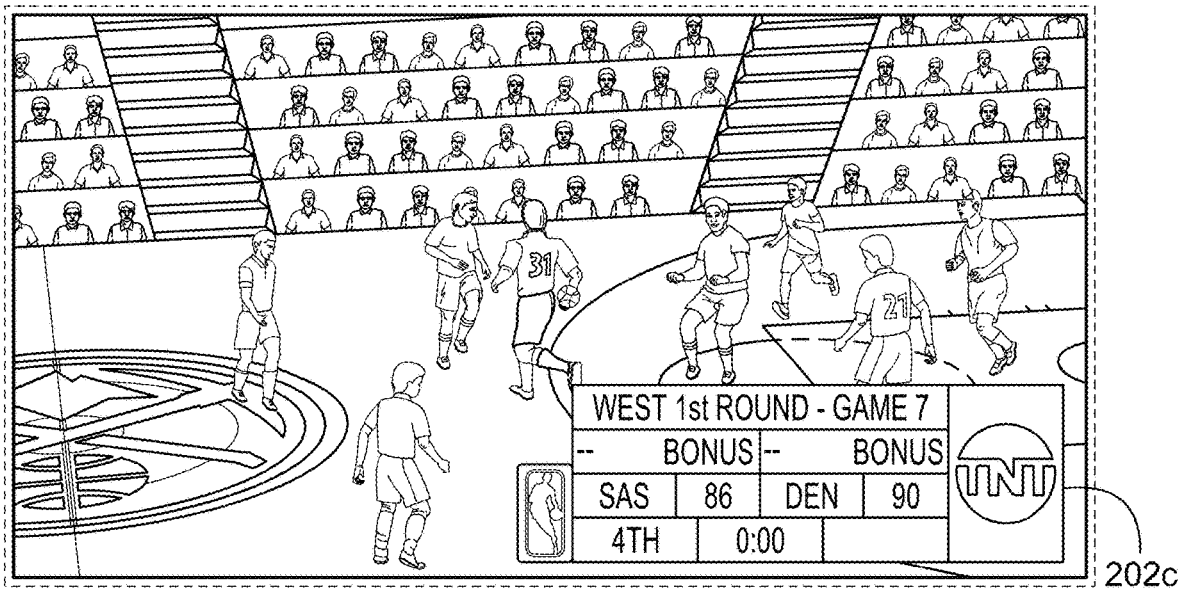

Frame 200c of FIG. 2C includes a game progress graphic 202c. As shown, in the game progress graphic 202c, the current time value is "4TH 00.0" (i.e., no time remaining in the fourth quarter). In response to determining that the current time value no longer matches the game clock time criteria associated with portion of the content scheduled to be recorded, the media guidance application instructs the user television equipment 106 to stop recording the portion of the content. Because the game clock time criteria specified the end of the game, the media guidance application may additionally determine if an overtime period will be played. For example, based on the retrieved timing rules, the media guidance application may determine that no overtime period will be played because the score is not tied at the end of regulation. If, however, the media guidance application determines that an overtime period will be played, the media guidance application may instruct the user television equipment 106 to continue to record the portion of the content until the media guidance application determines that the overtime period(s) is finished and the game is over. In some embodiments of the present disclosure, in order to avoid an abrupt ending to the recorded portion of the content, the media guidance application may instruct the user television equipment 106 to continue to record the content for a predetermined amount of time after the specified game clock time criteria has ended or while a play is ongoing after the specified game clock time criteria has ended.

Figure 2D:
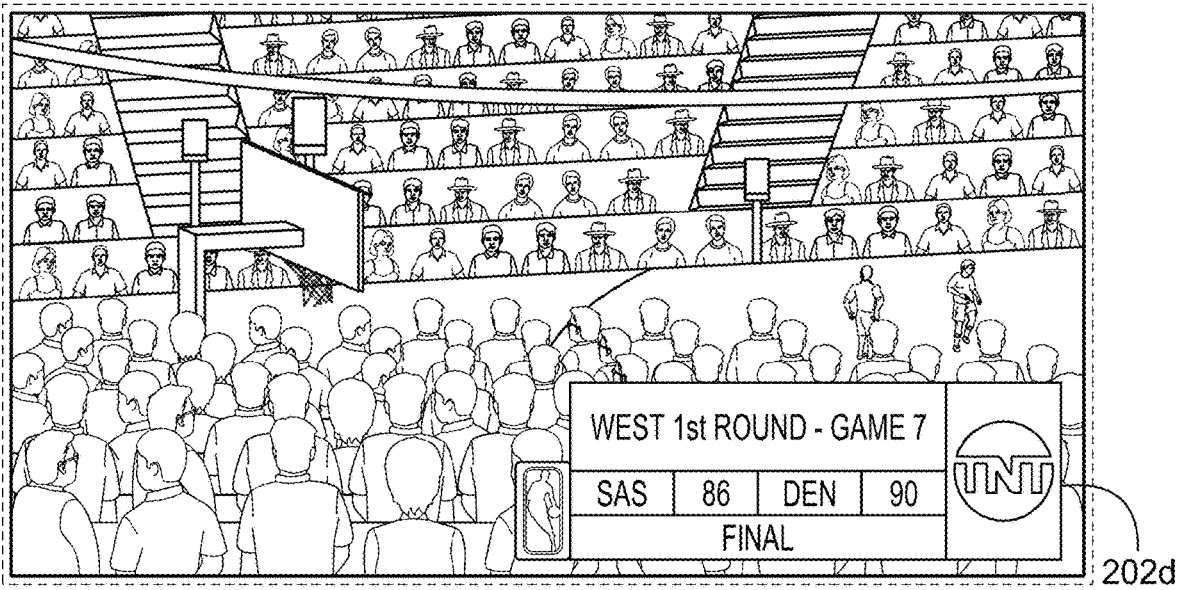

Frame 200*d* of FIG. 2D includes a game progress graphic 202*d*. As shown, in the game progress graphic 202*c*, "FINAL" has replaced the game clock. The media guidance application may determine that "FINAL" signifies the end of the game and instruct the user television equipment 106 to stop recording the content.

Although the game progress graphics (202*a*-202*d*) are described as different game progress graphics in FIGS. 2A-2D, for purposes of description, it should be understood that the different game progress graphics may refer to the same game progress graphic, which is updated to display the current progress of the game in different frames. Additionally, in some embodiments of the present disclosure, the media guidance application may track the current progress of the game in order to recognize replays of previous play to avoid stopping or starting the recording based on the game clock values shown in the replays. Additionally, in some embodiments of the present disclosure, the media guidance application may use machine learning to determine if, e.g., the game clock has been reset.

Figure 3:
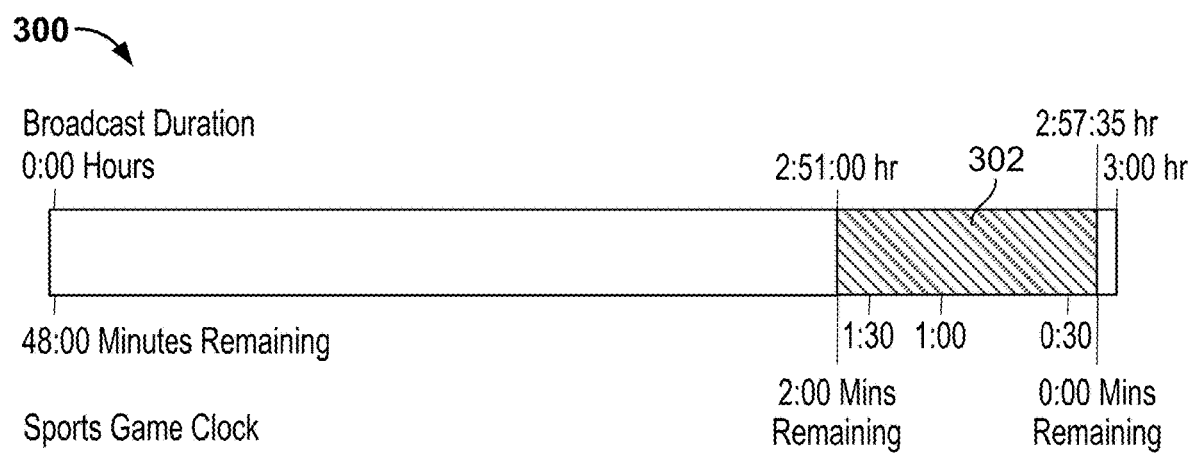
FIG. 3 shows an illustrative embodiment of a portion of the content of the sports game that is recorded, in accordance with some embodiments of the present disclosure.

FIG. 3 shows an illustrative embodiment of a portion of the content of the sports game that is recorded, in accordance with some embodiments of the present disclosure. As shown, the length of the entire content 300 of the San Antonio Spurs vs. the Denver Nuggets game is three hours (from 7:00 PM to 10:00 PM). As the game clock for an NBA game is only forty-eight minutes, the broadcast time does not correspond to the game clock time. As described above with reference to FIGS. 2A-2D, a portion 302 of the content that is recorded, corresponds to frames identified as corresponding to the "last two minutes" of the game. As shown, the portion 302 may extend from 2:51:00 to 2:57:35 of the broadcast time of the content 300. In some embodiments of the present disclosure, if the portion 302 extends beyond the scheduled broadcast time, the media guidance application may instruct the user television equipment 106 to continue to record the portion 302 until the game clock time criteria has ended. In some embodiments of the present disclosure, game clock information in the portion 302 may be tracked an included in enhanced metadata stored in association with the portion 302. In some embodiments of the present disclosure, the enhanced metadata may be used to navigate within the recorded portion 302. For example, a user may navigate to a specific game clock time in the recorded portion 302 or request playthrough of the recorded portion 302 so that only content when the game clock is running is shown (e.g., timeouts, clock stoppages, and commercials may be automatically skipped).

Figure 4:
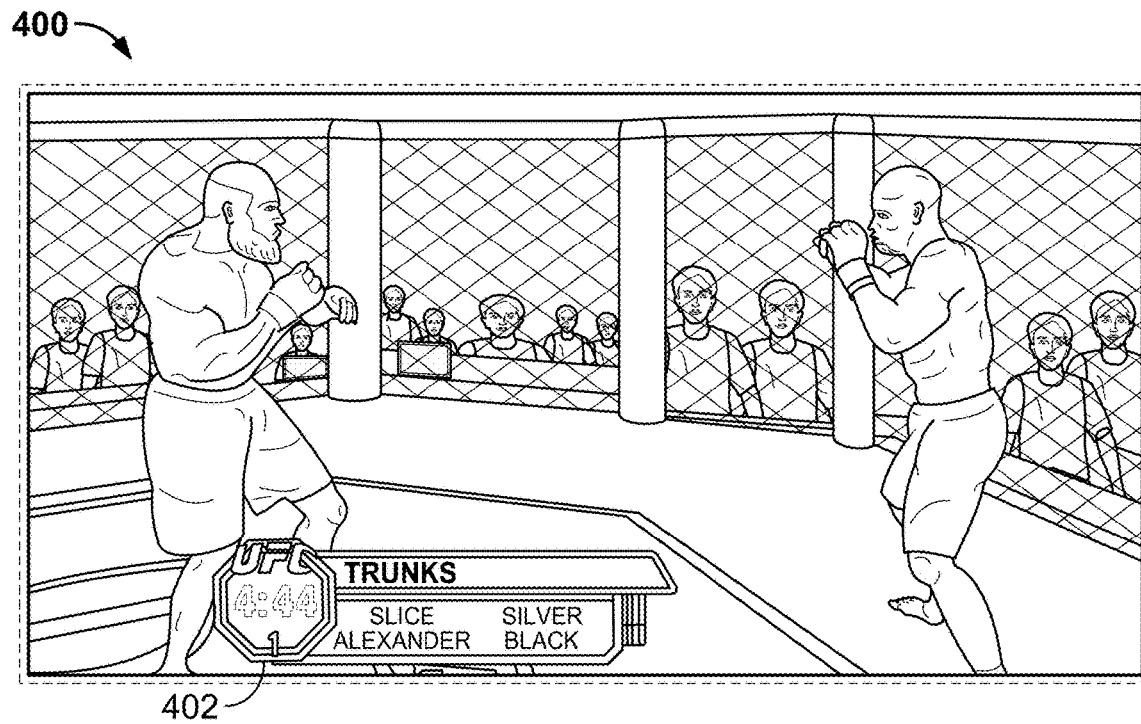
FIGS. 4-6 show examples of game progress graphics that may be shown in content of other sports, in accordance with some embodiments of the present disclosure.
Figure 5:
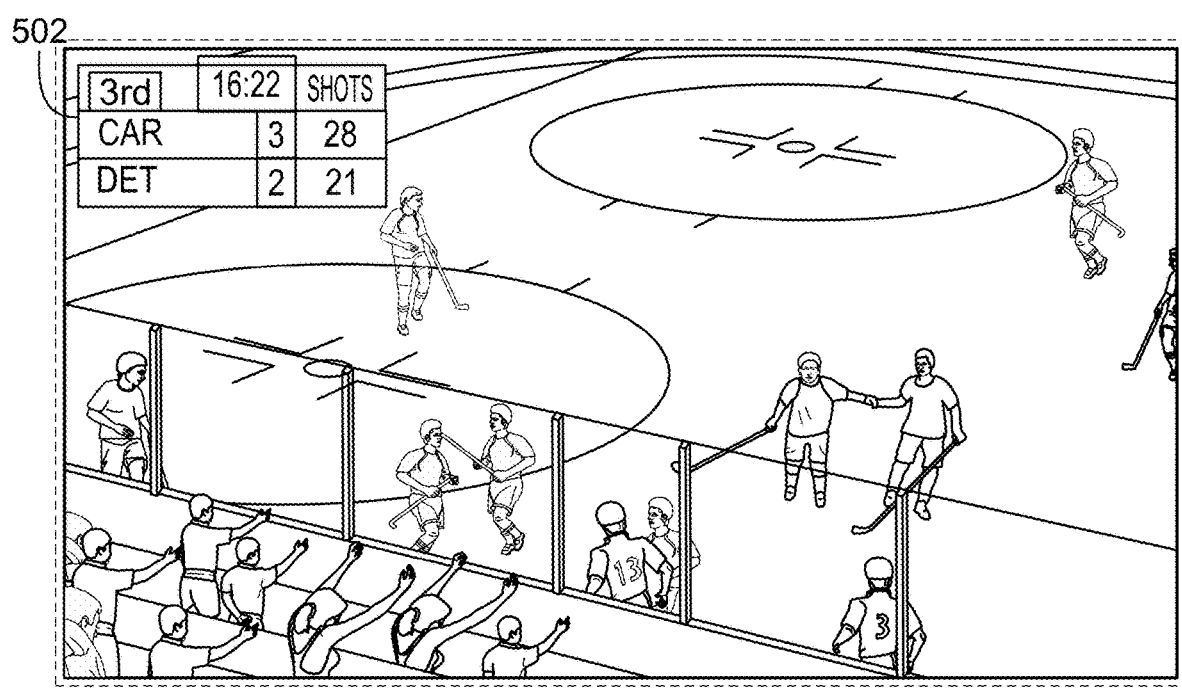
Figure 6:
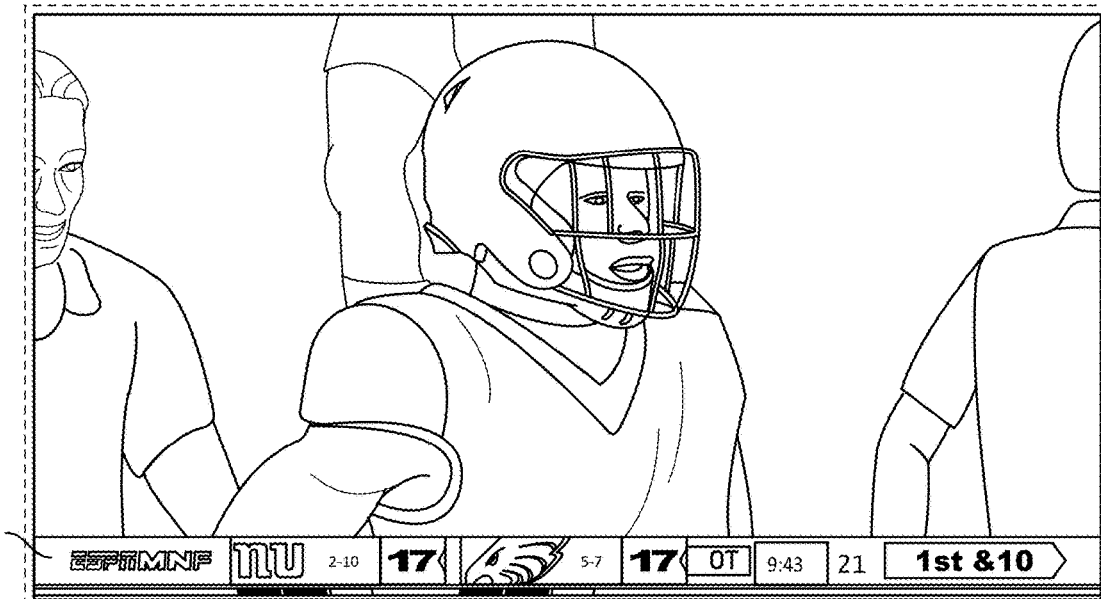

FIGS. 4-6 show examples of game progress graphics that may be shown in content of other sports, in accordance with some embodiments of the present disclosure. For example, FIG. 4 shows a frame 400 of content of a UFC fight. UFC is a trademark owned by Zuffa, LLC. As shown, the frame 400 includes a game progress graphic 402 corresponding to the timing rules of the UFC. The game progress graphic 402 may display the current round and time clock indicating the time remaining in the current round "1 4:44" (e.g., four minutes and forty-four seconds remaining in the first round, as well as the fighters in the fight "Slice Alexander" and "Silver Black"). In some embodiments of the present disclosure, the fight between "Slice Alexander" and "Silver Black" may be one of a plurality of fights in a single broadcast. Accordingly, in response to a user requesting to record "the UFC fight tonight between Slice and Silver," the media guidance application may instruct the user television equipment 106 to begin recording when the media guidance application identifies a game progress graphic 402 displaying "Slice Alexander" and "Silver Black" and time clock corresponding to the beginning of a UFC fight "1 5:00" (e.g., five minutes remaining in the first round). The information in the game progress graphic 402 may be identified in a similar manner as described above with reference to FIGS. 2A-2D.

FIG. 5 shows a frame 500 of content of a NHL hockey game. NHL is a trademark owned by NHL Enterprises, L.P. As shown, the frame 500 includes a game progress graphic 502 corresponding to the timing rules of the NHL. The game progress graphic 502 may display the current period and game clock indicating the time remaining in the current period "3rd 16:22" (e.g., sixteen minutes and twenty-two seconds remaining in the third period), as well as the current score and shots on goal.

FIG. 6 shows a frame 600 of content of an NFL football game. NFL is a trademark owned by NFL Properties LLC. As shown, the frame 600 includes a game progress graphic 602 corresponding to the timing rules of the NFL. The game progress graphic 602 may display the current quarter and game clock indicating the time remaining in the current period "OT 9:43" (e.g., nine minutes and forty-three seconds remaining in overtime), as well as the current score and down. By recognizing that an overtime period will occur and the end of regulation play (e.g., using the timing rules of the NFL), the media guidance application may continue to instruct the user television equipment 106 to record the portion of the content until the game is over, without inadvertently stopping the recording of the portion of the content in response to recognizing the end of regulation play.

Figure 7:
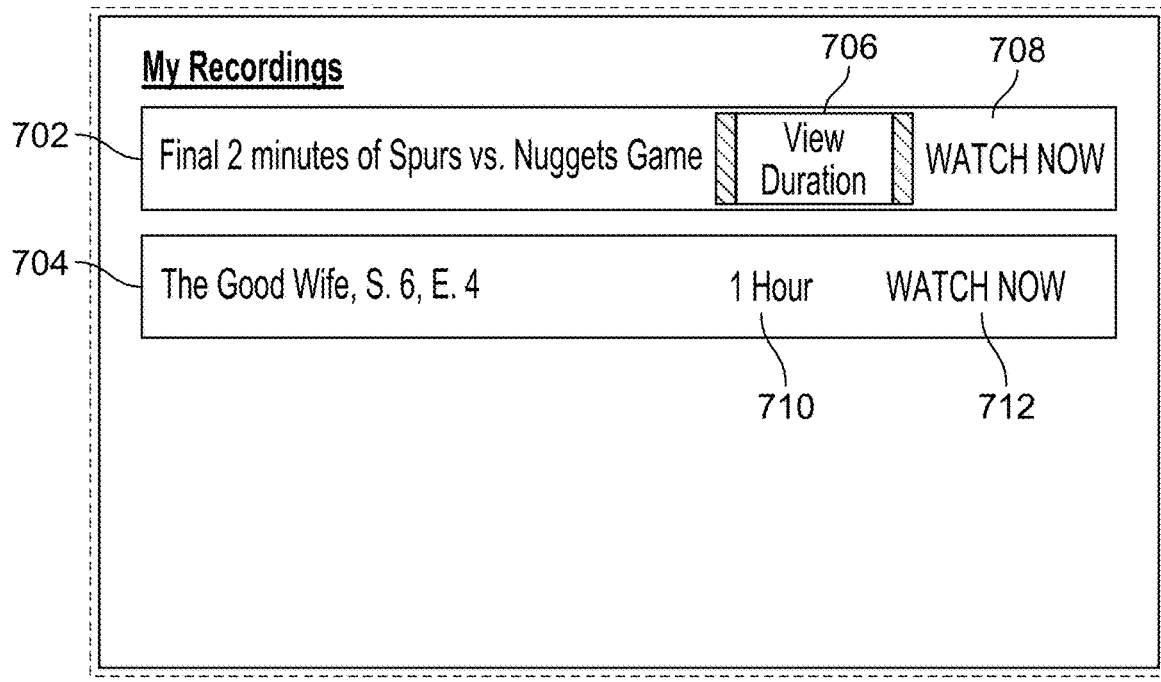
FIG. 7 shows an illustrative embodiment of a user interface that allows a user to select recorded content to play, in accordance with some embodiments of the present disclosure.

FIG. 7 shows an illustrative embodiment of a UI 700 that allows a user to select recorded content to play, in accordance with some embodiments of the present disclosure. The UI 700 may be displayed on the user television equipment 106, on a remote for the user television equipment 106, or on any other user display device or scheduling device associated with the user television equipment 106. The UI 700 may be generated for display based on content that is recorded on user television equipment 106 or storage accessible to the user television equipment 106 (e.g., removable storage or remote storage). For example, the UI 700 may include an icon 702 representing the recording of the final two minutes of the Spurs vs. Nuggets game and an icon 704 representing the recording of Season 6, Episode 4 of The Good Wife.

In some embodiments of the present disclosure, in order to avoid spoilers for recordings of portions of content, the UI 700 may obscure the duration of such partial recordings. For example, the UI 700 may display banner 706 to obscure the duration of the final two minutes of the Spurs vs. Nuggets game. In this way, if the recorded portion is long (e.g., because the game went into overtime) or short (e.g., because the score was not close and the game clock ran out quickly), the game will not be spoiled when the user is viewing the UI 700, unless the user selects the display banner 706 to display the duration of the recorded portion. Additionally, if the user 102 selects watch now icon 708 to play the recorded portion, a progress bar indicating how much time is left in the recorded portion may be obscured when the portion of the content is played. In contrast, because the recording of Season 6, Episode 4 of The Good Wife is not a partial recording, the duration of the recording may be displayed by the duration icon 710. Additionally, if the user 102 selects watch now icon 712 to play the recorded content, the progress bar may be shown (i.e., not obscured) when the content is played.

Figure 8:
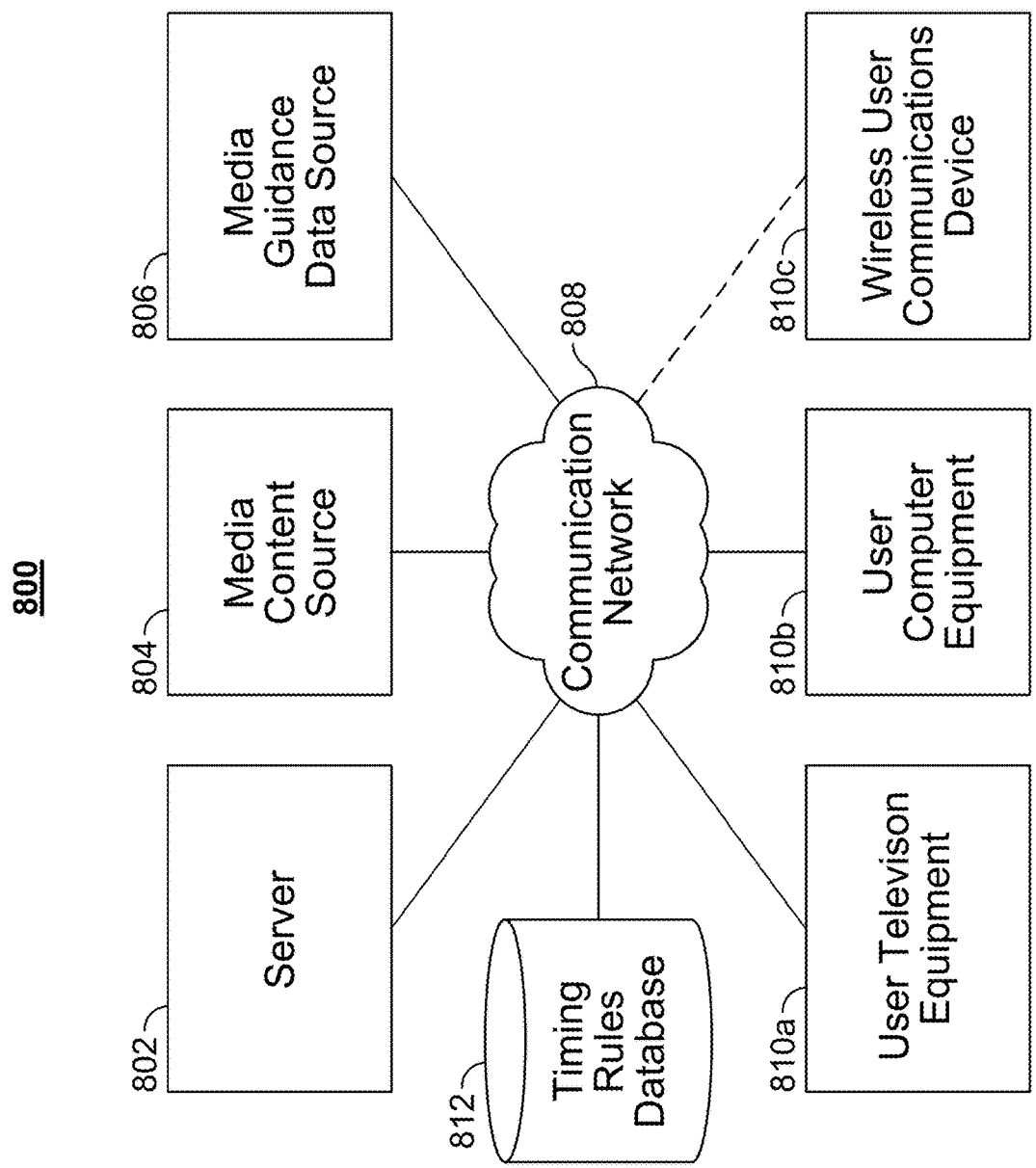
FIG. 8 shows an illustrative block diagram of a system for recording a portion of content of a sports game, in accordance with some embodiments of the present disclosure.

FIG. 8 shows an illustrative block diagram of a system 800 for recording a portion of content of a sports game, in accordance with some embodiments of the present disclosure. In various aspects, the system 800 includes one or more of a server 802, a media content source 804, a media guidance data source 806, a communication network 808, one or more computing devices 810, such as user television equipment 810*a* (e.g., a TV, a set-top box, etc.), user computer equipment 810*b*, and/or wireless user communications device 810*c* (e.g., a smartphone device), and a timing rules database 812. Although FIG. 1 shows one of each component, in various examples, the system 800 may include fewer than the illustrated components and/or multiples of one or more illustrated components. The communication network 808 may be any type of communication network, such as the Internet, a mobile phone network, mobile voice or data network (e.g., a 4G or LTE network), cable network, public switched telephone network, or any combination of two or more of such communication networks. The communication network 808 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The communication network 808 communicatively couples various components of the system 800 to one another. For instance, the server 802 may be communicatively coupled to the media content source 804, the media guidance data source 806, the computing device 810, and/or the timing rules database 812 via communication network 808.

In some examples, the media content source 804 and the media guidance data source 806 may be integrated as one device. The media content source 804 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. The media content source 804 may be the originator of content (e.g., a television broadcaster, a Webcast provider, etc.) or may not be the originator of content (e.g., an on-demand content provider, an Internet provider of content of broadcast programs for downloading, etc.). The media content source 804 may include cable sources, satellite providers, on-demand providers, Internet providers, over-the-top content providers, or other providers of content. The media content source 804 may also include a remote media server used to store different types of content (e.g., including video content selected by a user or requested to be recorded by a user) in a location remote from the computing device 810.

The media content source 804 and the media guidance data source 806 may provide content and/or media guidance data to the computing device 810 and/or the server 802 using any suitable approach. In some embodiments of the present disclosure, the media guidance data source 806 may provide a stand-alone interactive television program guide that receives program guide data via a data feed (e.g., a continuous feed or trickle feed). In some examples, the media guidance data source 806 may provide program schedule data and other guidance data to the computing device 810 on a television channel sideband, using an in-band digital signal, an out-of-band digital signal, or any other suitable data transmission technique.

As described in further detail below, the server 802 manages the communication of a live content stream (e.g., a live sports game broadcast, a live news broadcast, or the like) from the media content source 804 to the computing device 810 via the communication network 808. For instance, in some embodiments of the present disclosure, content from the media content source 804 and/or guidance data from the media guidance data source 806 may be provided to the computing device 810 using a client/server approach. In such examples, the computing device 810 may pull content and/or media guidance data from the server 802 and/or the server 802 may push content and/or media guidance data to the computing device 810. In some embodiments of the present disclosure, a client application residing on the computing device 810 may initiate sessions with the server 802, the media content source 804, and/or the media guidance data source 806 to obtain content and/or guidance data when needed, e.g., when the guidance data is out-of-date or when the computing device 810 receives a request from the user to receive content or guidance data. In various aspects, the server 802 may also be configured to detect events within the live content stream and, based on the detected events, control the display of content and/or navigation menu options via computing device 810. Additionally, although FIG. 8 shows the media content source 804 and the media guidance data source 806 as separate from the server 802, in some embodiments of the present disclosure, the media content source 804 and/or the media guidance data source 806 may be integrated as one device with the server 802.

The timing rules database 812 store timing rules for a plurality of sports and may provide these timing rules to the computing device 810 using any suitable approach. Although FIG. 8 shows the timing rules database 812 as a database, in some embodiments of the present disclosure, the timing rules database 812 may be implemented by a rules engine (e.g., a business rules engine provided as a component of a business rule management system solution). Additionally, although FIG. 8 shows the timing rules database 812 as separate from the server 802 and the computing device 810, in some embodiments of the present disclosure, the timing rules database 812 may be integrated with the server 802 and/or the computing device 810.

Content and/or media guidance data delivered to the computing device 810 may be over-the-top (OTT) content. OTT content delivery allows Internet-enabled user devices, such as the computing device 810, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include YOUTUBE, NETFLIX, and HULU, which provide audio and video via IP packets. YouTube is a trademark owned by Google LLC; Netflix is a trademark owned by Netflix, Inc.; and Hulu is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on the computing device 810.

Figure 9:
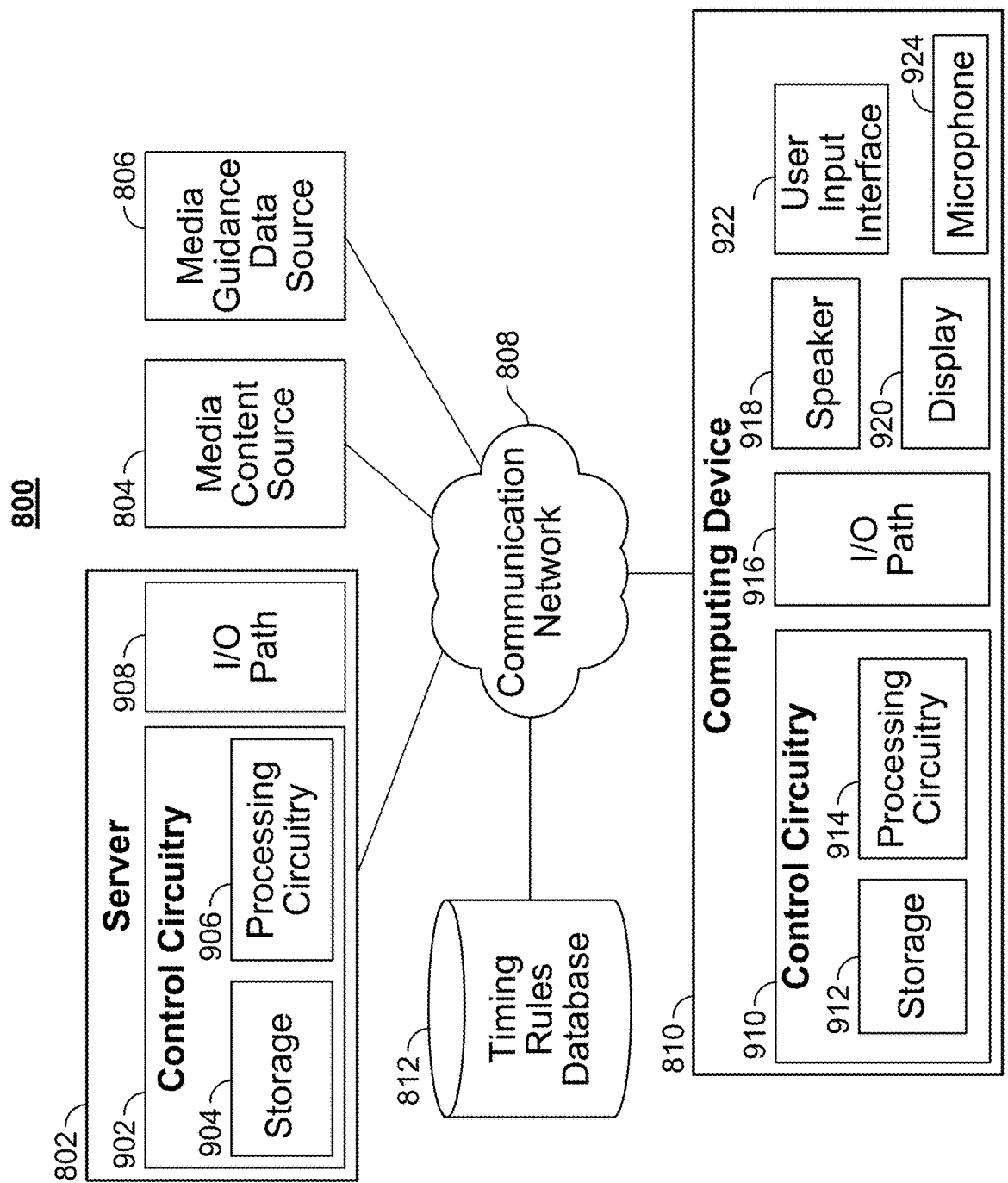
FIG. 9 is an illustrative block diagram showing additional details of the system of FIG. 8, in accordance with some embodiments of the present disclosure.

FIG. 9 is an illustrative block diagram showing additional details of the system 800 of FIG. 8, in accordance with some embodiments of the present disclosure. In particular, the server 802 includes control circuitry 902 and an I/O path 908, and the control circuitry 902 includes a storage 904 and processing circuitry 906. The computing device 810 includes control circuitry 910, an I/O path 916, a speaker 918, a display 920, a user input interface 922, and a microphone 924. The control circuitry 910 includes a storage 912 and processing circuitry 914. The control circuitry 902 and/or 910 may be based on any suitable processing circuitry such as the processing circuitry 906 and/or 914. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments of the present disclosure, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of the storage 904, the storage 912, and/or storages of other components of system 800 (e.g., storages of the media content source 804, media guidance data source 806, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, BLU-RAY disc (BD) recorders, BLU-RAY 3D disc recorders, digital video recorders (DVRs, sometimes called a personal video recorder, or PVR), solid-state devices, quantum storage devices, gaming consoles, gaming media, or any other suitable fixed or removable storage devices, and/or any combination of the same. Each of the storage 904, the storage 912, and/or storages of other components of the system 800 may be used to store various types of content, media guidance data, and or other types of data. Non-volatile memory may also be used (e.g., to launch a boot-up routine and other instructions). Cloud-based storage may be used to supplement the storages 904, 912 or instead of the storages 904, 912. In some embodiments of the present disclosure, the control circuitry 902 and/or 910 executes instructions for an application (e.g., the media guidance application) stored in memory (e.g., the storage 904 and/or 912). Specifically, the control circuitry 902 and/or 910 may be instructed by the application to perform the functions discussed herein. In some implementations, any action performed by the control circuitry 902 and/or 910 may be based on instructions received from the application. For example, the application may be implemented as software or a set of executable instructions that may be stored in the storage 904 and/or 912 and executed by the control circuitry 902 and/or 910. In some embodiments of the present disclosure, the application may be a client/server application where only a client application resides on the computing device 810, and a server application resides on the server 802.

The application may be implemented using any suitable architecture. For example, it may be a stand-alone application wholly implemented on the computing device 810. In such an approach, instructions of the application are stored locally (e.g., in the storage 912), and data for use by the application is downloaded on a periodic basis (e.g., from an out-of-band feed, from an Internet resource, or using another suitable approach). The control circuitry 914 may retrieve instructions of the application from the storage 912 and process the instructions to perform the functionality described herein. Based on the processed instructions, the control circuitry 914 may determine what action to perform when input is received from the user input interface 922 or the microphone 924.

In client/server-based embodiments, the control circuitry 910 may include communication circuitry suitable for communicating with an application server (e.g., the server 802) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., the communication network 808). In another example of a client/server-based application, the control circuitry 910 runs a web browser that interprets web pages provided by a remote server (e.g., the server 802). For example, the remote server may store the instructions for the application in a storage device. The remote server may process the stored instructions using circuitry (e.g., the control circuitry 902) and generate the displays discussed above and below. The computing device 810 may receive the displays generated by the remote server and may display the content of the displays locally via the display 920. This way, the processing of the instructions is performed remotely (e.g., by the server 802) while the resulting displays, such as the display windows described elsewhere herein, are provided locally on the computing device 810. The computing device 810 may receive inputs from the user via the input interface 922 or the microphone 924 and transmit those inputs to the remote server for processing and generating the corresponding displays.

A user may send instructions to the control circuitry 902 and/or 910 using the user input interface 922. The user input interface 922 may be any suitable user interface, such as a remote control, trackball, keypad, keyboard, touchscreen, touchpad, stylus input, joystick, voice recognition interface, or other user input interfaces. The user input interface 922 may be integrated with or combined with the display 920, which may be a monitor, a television, a liquid crystal display (LCD), electronic ink display, or any other equipment suitable for displaying visual images.

The server 802 and the computing device 810 may receive content and data via the I/O path 908 and 916, respectively. For instance, the I/O path 916 may include a communication port configured to receive a live content stream from the server 802 and/or the media content source 804 via the communication network 808. The storage 912 may be configured to buffer the received live content stream for playback, and the display 920 may be configured to present the buffered content, navigation options, alerts, and/or the like via a primary display window and/or a secondary display window. The I/O paths 908, 916 may provide content (e.g., a live stream of content, broadcast programming, on-demand programming, Internet content, content available over a local area network (LAN) or wide area network (WAN), and/or other content) and data to the control circuitry 902, 910. The control circuitry 902, 910 may be used to send and receive commands, requests, and other suitable data using the I/O paths 908, 916. The I/O paths 908, 916 may connect the control circuitry 902, 910 (and specifically the processing circuitry 906, 914) to one or more communication paths. I/O functions may be provided by one or more of these communication paths but are shown as single paths in FIG. 2 to avoid overcomplicating the drawing.

Figure 10:
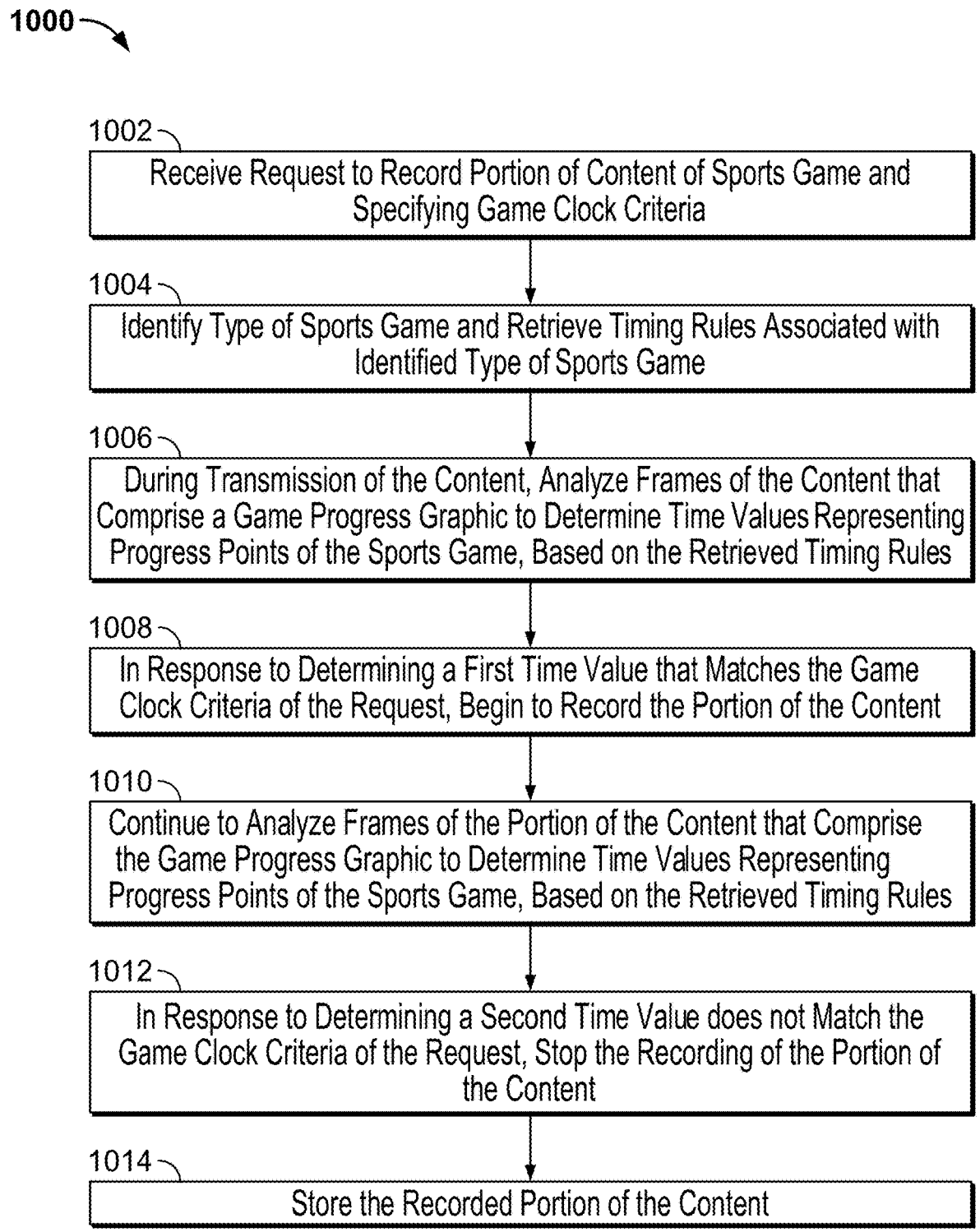
FIG. 10 shows an illustrative flowchart of a process for recording a portion of content of a sports game, in accordance with some embodiments of the present disclosure.

Having described the system 800, reference is now made to FIG. 10, which depicts an illustrative flowchart of a process 1000 for recording a portion of content of a sports game that may be implemented by using the system 800, in accordance with some embodiments of the present disclosure. In various embodiments, individual steps of process 1000 may be implemented by one or more components of the system 800. Although the present disclosure may describe certain steps of process 1000 (and of other processes described herein) as being implemented by certain components of the system 800, this is for purposes of illustration only, and it should be understood that other components of the system 800 may implement those steps instead. For example, steps of process 1000 may be executed by the computing device 810 to receive a user command to record a portion of content of a future sports game, analyze frames of the content to identify frames comprising a game progress graphic corresponding to the game clock time criteria in the request, recording the identified frames, and storing the recorded portion of the content.

The process 1000 begins a step 1002, when the media player application (e.g., via the control circuitry 910) may receive a request (e.g., via the user input interface 922 or the microphone 924) to record a portion of content of a future sports game and specifying game clock time criteria.

At step 1004, the media player application (e.g., via the control circuitry 910) may identify the type of sports game included in the request and retrieve timing rules associated with the identified type of sports game. For example, the control circuitry 910 may analyze metadata included in the listing of the content (e.g., from the media guidance data source 806) to identify the type of sports game. Based on the identified type of sports game, the control circuitry 910 may retrieve (e.g., from the timing rules database 812) timing rules associated with the identified type of sports game.

At step 1006, the media player application (e.g., via the control circuitry 910), during transmission of the content (e.g., from the media content source 804), analyze frames of the content that comprise a game progress graphic to determine timing values representing progress points of the sports game, based on the retrieved timing rules. For example, the control circuitry 910 may use machine learning and/or IR-OCR algorithms to determine the timing values.

At step 1008, the media player application (e.g., via the control circuitry 910), in response to determining a first time value that matches the game clock criteria of the request, begins to record the portion of the content.

At step 1010, the media player application (e.g., via the control circuitry 910) may continue to analyze frames of the portion of the content that comprise the game progress graphic to determine time values representing progress points of the sports game, based on the retrieved timing rules.

At step 1012, the media player application (e.g., via the control circuitry 910), in response to determining that a second time value does not match the game clock criteria of the request, may stop the recording of the portion of the content.

At step 1014, the media player application (e.g., via the control circuitry 910) may control storage (e.g., the storage 912) to store the recorded portion of the content.

Figure 11:
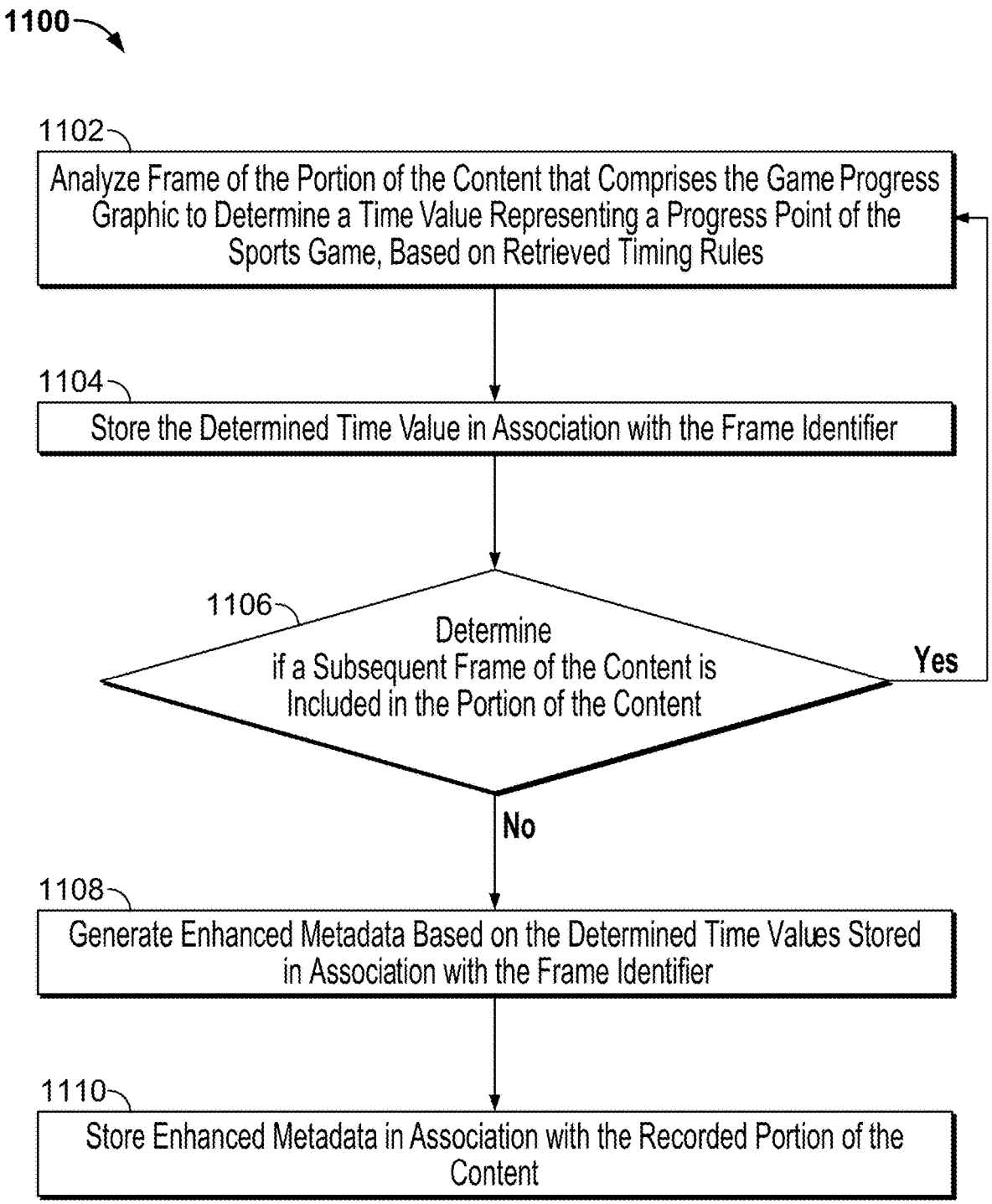
FIG. 11 is a flowchart of illustrative steps in step 1010 of FIG. 10, in accordance with some embodiments of the present disclosure.

FIG. 11 is a flowchart of illustrative steps in step 1010 of FIG. 10, in accordance with some embodiments of the present disclosure.

At step 1102, the media player application (e.g., via the control circuitry 910) may analyze a frame of the portion of the content that comprises the game progress graphic to determine a time value representing a progress points of the sports game, based on the retrieved timing rules.

At step 1102, the media player application (e.g., via the control circuitry 910) may control storage (e.g., the storage 912) to store the determined time value in association with an identifier of the frame of the content.

At step 1106, the media player application (e.g., via the control circuitry 910) may determine if a subsequent frame of the content (e.g., the next frame to be analyzed based on the frequency in which the frames are analyzed) is included in the portion of the content. For example, the control circuitry may analyze the game progress graphic in the subsequent frame to determine if the time value still matches the game clock criteria of the request. If the subsequent frame is determined to be included in the portion of content (Step 1106: Yes), the control circuitry 910 may return to step 1102 and analyze the subsequent frame. If, however, the subsequent frame is determined not to be included in the portion of content (Step 1106: No), the control circuitry 910 may proceed to step 1108.

At step 1108, the media player application (e.g., via the control circuitry 910) may generate enhanced metadata based on the determined time values for all the analyzed frames in the recorded portion of the content.

At step 1110, the media player application (e.g., via the control circuitry 910) may control storage (e.g., storage 912) to store the enhanced metadata in association with the recorded portion of the content.

It is contemplated that the steps or descriptions of FIG. 10 or 11 may be used with any other embodiment of this disclosure. In addition, the descriptions described in relation to the algorithms of FIG. 10 or 11 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments of the present disclosure, several instances of a variable may be evaluated in parallel, using multiple logical processor threads, or the algorithm may be enhanced by incorporating branch prediction. Furthermore, it should be noted that the processes of FIG. 10 or 11 may be implemented on a combination of appropriately configured software and hardware, and that any of the devices or equipment discussed in relation to FIGS. 1 and 8-9 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method comprising:
receiving a request to record media content showing a sports game;
identifying, by control circuitry, based at least in part on the sports game, game timing rules associated with the sports game;
generating, by the control circuitry, based at least in part on the identified game timing rules, a graphical user interface displaying time intervals corresponding to portions of the sports game;
receiving, by the control circuitry, a user selection of a first time interval of the displayed time intervals, the user selection indicating a request to record less than an entirety of the sports game;
during transmission of the media content, determining by the control circuitry, based on a first game progress graphic of the media content, a first progress point of the sports game;
in response to determining, by the control circuitry, that the first progress point of the sports game corresponds to a recording start criterion of the request to record, beginning to record the media content;
and
causing, by the control circuitry, a recorded portion of the media content to be stored.

2. The method of claim 1, wherein the request to record media content showing a sports game is a natural language command received.

3. The method of claim 1, wherein the determining the first progress point comprises:
identifying the first game progress graphic in a first frame of the media content; and
analyzing the identified first game progress graphic using optical character recognition to determine, based on the retrieved timing rules associated with the identified sport, the first progress point.

4. The method of claim 3, wherein the first game progress graphic comprises; a game clock, and at least one other progress indicator associated with the game clock.

5. The method of claim 1, further comprising:
identifying the first progress point based on at least one other progress indicator that indicates a quarter, a period, a half, or a round of the sports game.

6. The method of claim 1, wherein the request to record less than an entirety of the sports game comprises a recording start criterion comprising a recording start time value corresponding to the sports game, and wherein determining that the first progress point of the sports game corresponds to the recording start criterion of the request to record comprises:
determining that the first progress point of the sports game corresponds to a time value of the sports game; and
determining that the time value of the sports game matches the recording start time value.

7. The method of claim 6, wherein the recording end criterion comprises an end of the sports game, and wherein determining that a second progress point of the sports game corresponds to the recording end criterion comprises determining that the second progress point of the sports game indicates that an end of the sports game has been reached.

8. The method of claim 7, wherein the end of the sports game is an end of a game overtime portion of the media content.

9. The method of claim 1, further comprising:
generating for display a user interface comprising a first selectable image representing the recorded portion of the media content, wherein the user interface hides from display a duration of the recorded portion of the media content.

10. The method of claim 1, further comprising:
in response to determining that the media content comprises overtime play, continuing to record the portion of the media content until an end of the overtime play.

11. The method of claim 1, further comprising:
analyzing, by the control circuitry, an identified second game progress graphic to determine, based at least in part on the retrieved game timing rules associated with the sports game, that the sports game will continue into an overtime portion;
causing, by the control circuitry, continuing recording of the sports game, including the overtime portion.

12. A system comprising:
a memory; and
control circuitry configured:
to receive a request to record media content showing a sports game;
to identify based at least in part on the sports game, game timing rules associated with the sports game;
to generate, based at least in part on the identified game timing rules, a graphical user interface displaying time intervals corresponding to portions of the sports game;
to receive a user selection of a first time interval of the displayed time intervals, the user selection indicating a request to record less than an entirety of the sports game;
during transmission of the media content, to determine, based on a first game progress graphic of the media content, a first progress point of the sports game;
in response to determining that the first progress point of the sports game corresponds to a recording start criterion of the request to record, to begin to record the media content;
and
to cause a recorded portion of the media content to be stored.

13. The system of claim 12, wherein the request to record media content showing a sports game is a natural language command received.

14. The system of claim 12, wherein the determining the first progress point comprises:
identifying the first game progress graphic in a first frame of the media content; and
analyzing the identified first game progress graphic using optical character recognition to determine, based on the retrieved timing rules associated with the identified sport, the first progress point.

15. The system of claim 14, wherein the first game progress graphic comprises: a game clock, and at least one other progress indicator associated with the game clock.

16. The system of claim 12, wherein the system is further configured:

to identify the first progress point based on at least one other progress indicator that indicates a quarter, a period, a half, or a round of the sports game.

17. The system of claim 12, wherein the request to record less than an entirety of the sports game comprises a recording start criterion comprising a recording start time value corresponding to the sports game, and wherein determining that the first progress point of the sports game corresponds to the recording start criterion of the request to record comprises:
   determining that the first progress point of the sports game corresponds to a time value of the sports game; and
   determining that the time value of the sports game matches the recording start time value.

18. The system of claim 17, wherein the recording end criterion comprises an end of the sports game, and wherein determining that a second progress point of the sports game corresponds to the recording end criterion comprises determining that the second progress point of the sports game indicates that an end of the sports game has been reached.

19. The system of claim 18, wherein the end of the sports game is an end of a game overtime portion of the media content.

20. The system of claim 12, wherein the system is further configured:
   to generate for display a user interface comprising a first selectable image representing the recorded portion of the media content, wherein the user interface hides from display a duration of the recorded portion of the media content.

* * * * *